US005611286A

United States Patent [19]

Liermann

[11] Patent Number: 5,611,286
[45] Date of Patent: Mar. 18, 1997

[54] REMOTELY EXTENDIBLE BUNK STAKE FOR LOGGING VEHICLE

[76] Inventor: John Liermann, HCR-01, Box 222, Naples, Id. 83847-9704

[21] Appl. No.: 571,357

[22] Filed: Dec. 13, 1995

[51] Int. Cl.⁶ .................................................. B61D 49/00
[52] U.S. Cl. ............................................................ 105/389
[58] Field of Search ................................... 105/380, 389, 105/378; 410/37, 45, 29.1; 280/146; 296/43; 92/85 B, 165 R, 117 A

[56] References Cited

U.S. PATENT DOCUMENTS

| | | | |
|---|---|---|---|
| 3,374,029 | 3/1968 | Barker | 296/28 |
| 3,712,639 | 1/1973 | Rysdam, II | 280/146 |
| 4,375,893 | 3/1983 | Curtis | 280/146 |
| 4,668,000 | 5/1987 | Jokela | 296/15 |

Primary Examiner—Mark T. Le
Attorney, Agent, or Firm—Wells, St. John, Roberts, Gregory & Matkin, P.S.

[57] ABSTRACT

An extendible bunk stake mounted on a logging vehicle has an extension member that can be raised and lowered within a support member by an operator. A remotely actuatable motor, such as a source of working fluid and an expansible working chamber can be enabled by an operator to raise and lower the extension member from a safe distance away from a log loading area of the vehicle. Particularly, during periods of inclement weather, a vehicle operator can safely raise and lower the extension member without having to climb on top of the vehicle, greatly reducing any risk of related injury.

19 Claims, 6 Drawing Sheets

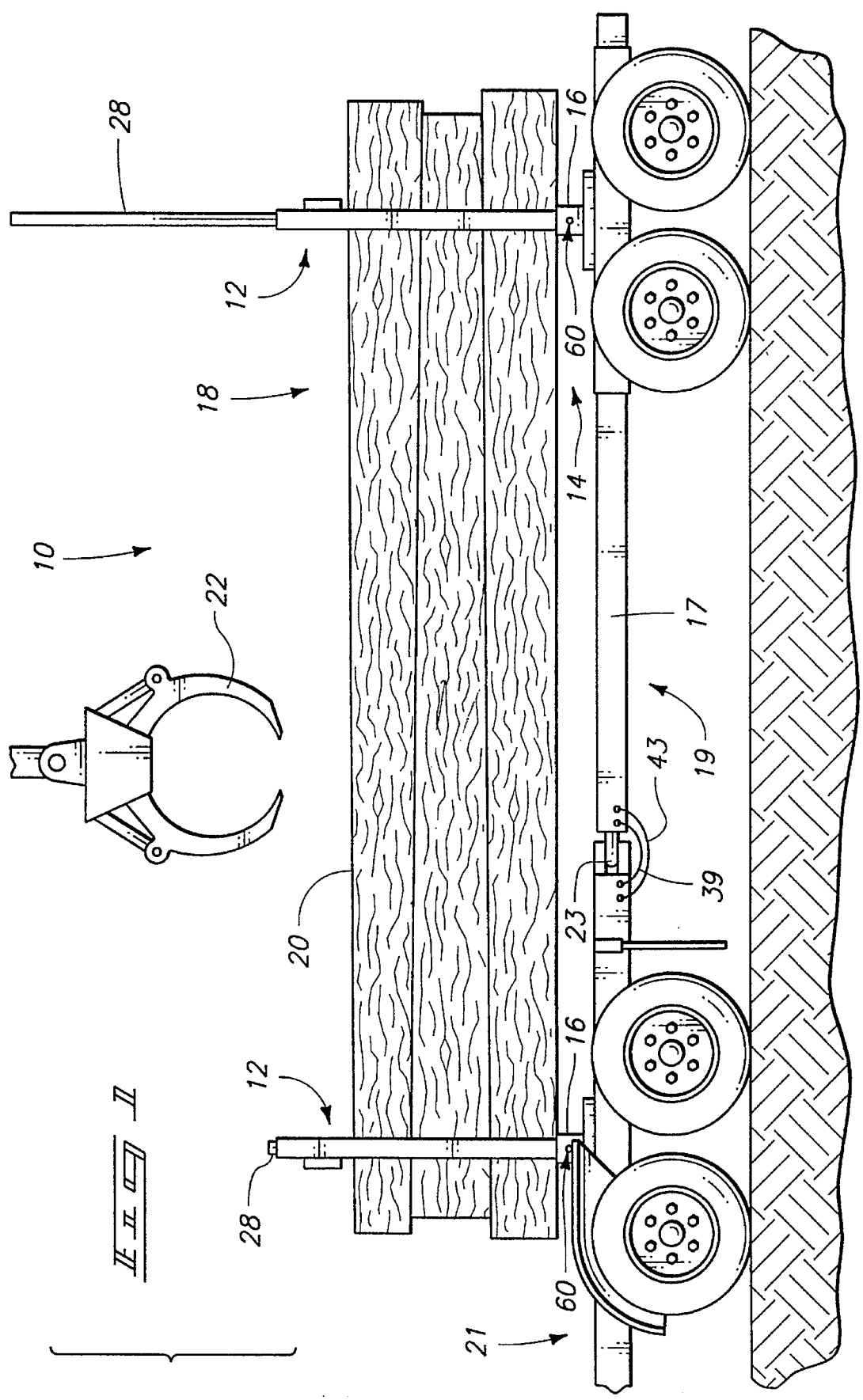

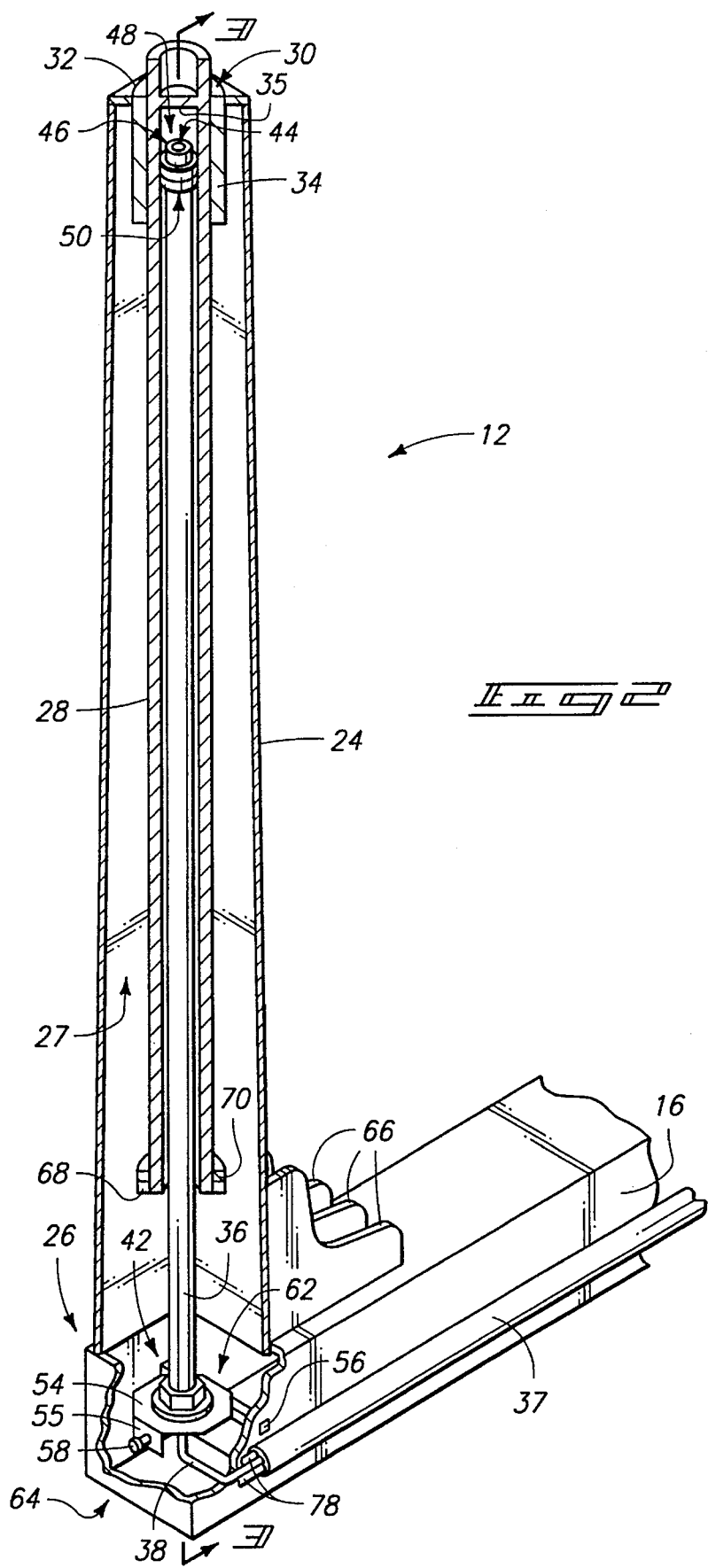

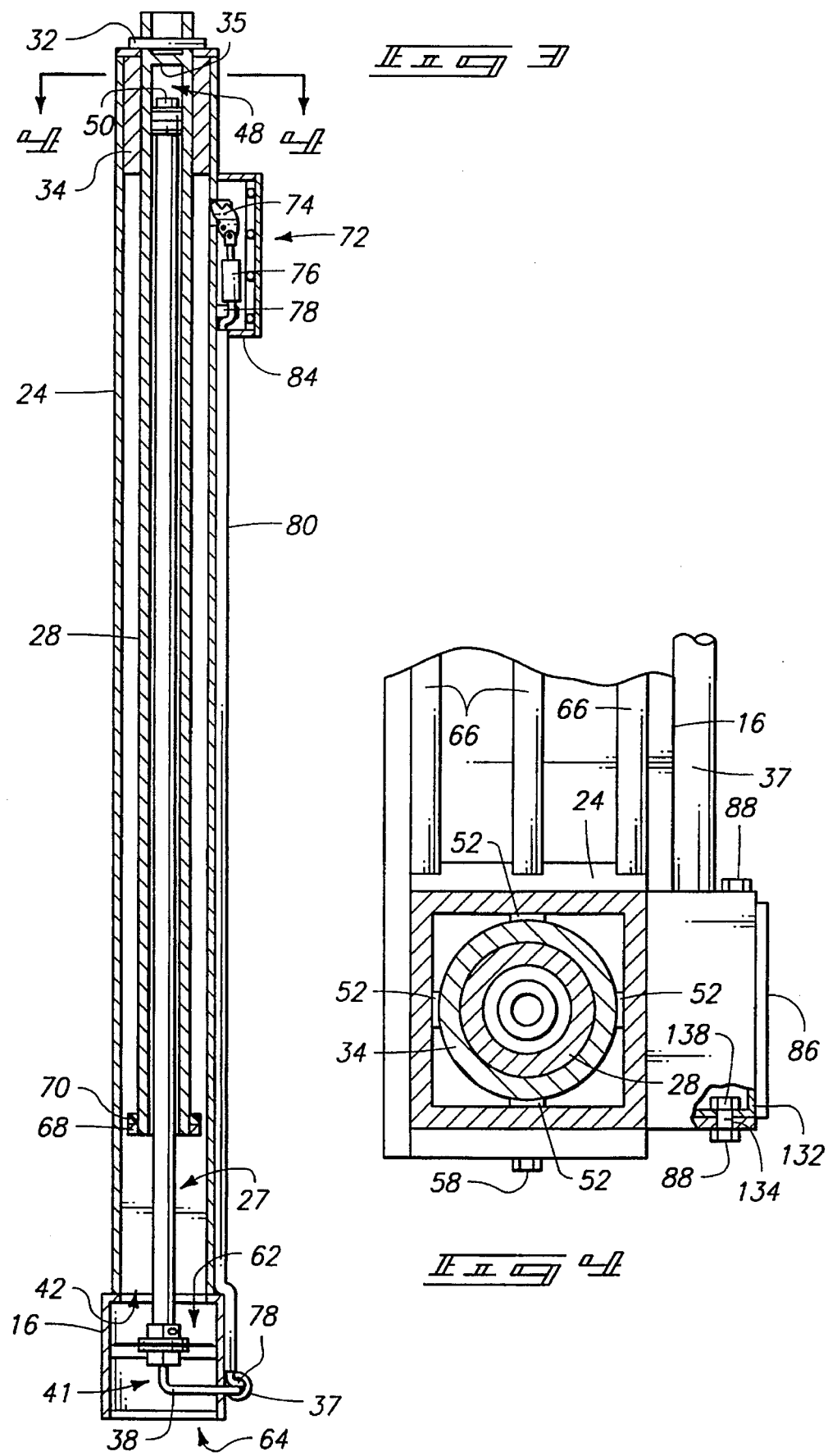

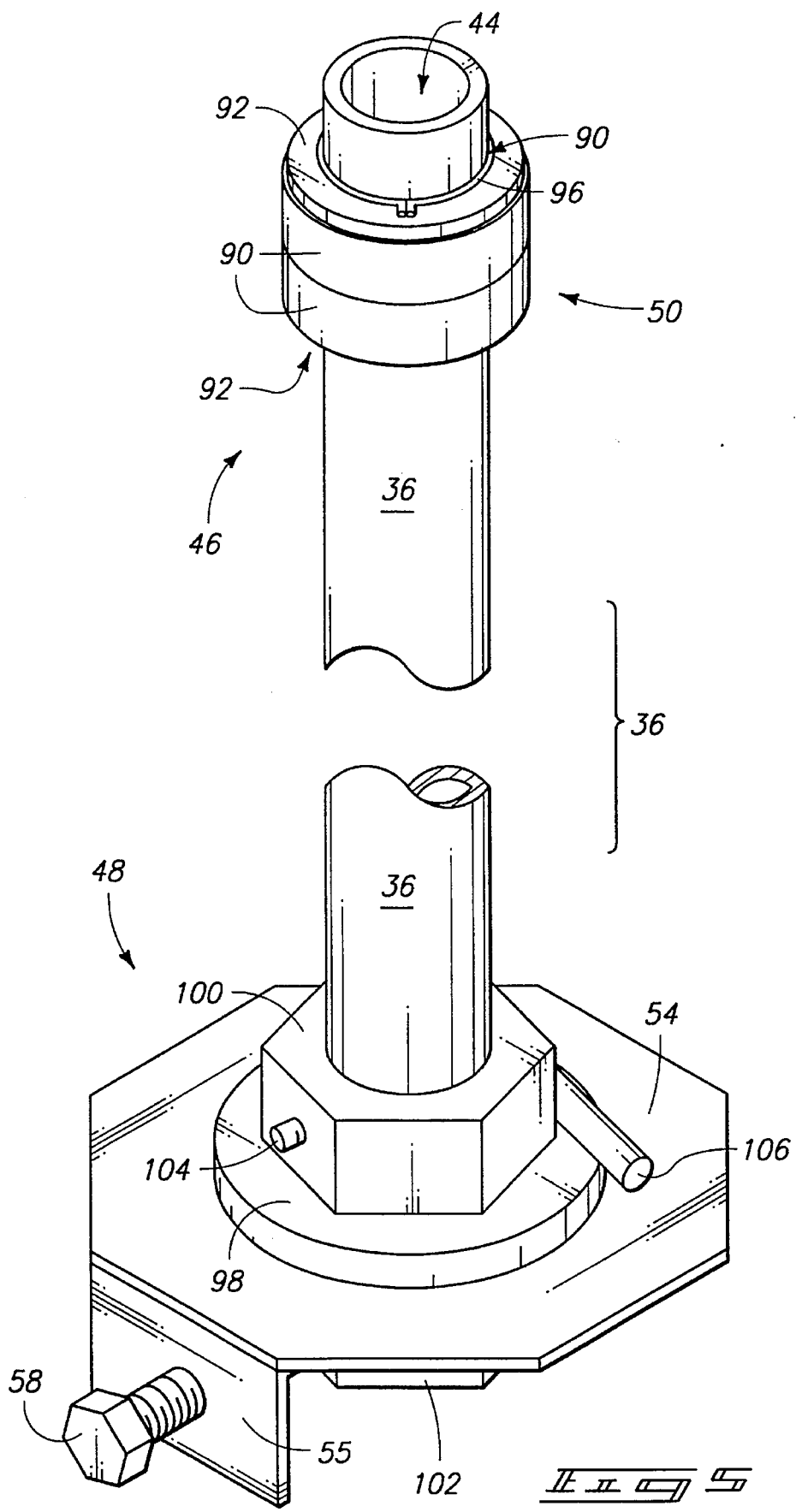

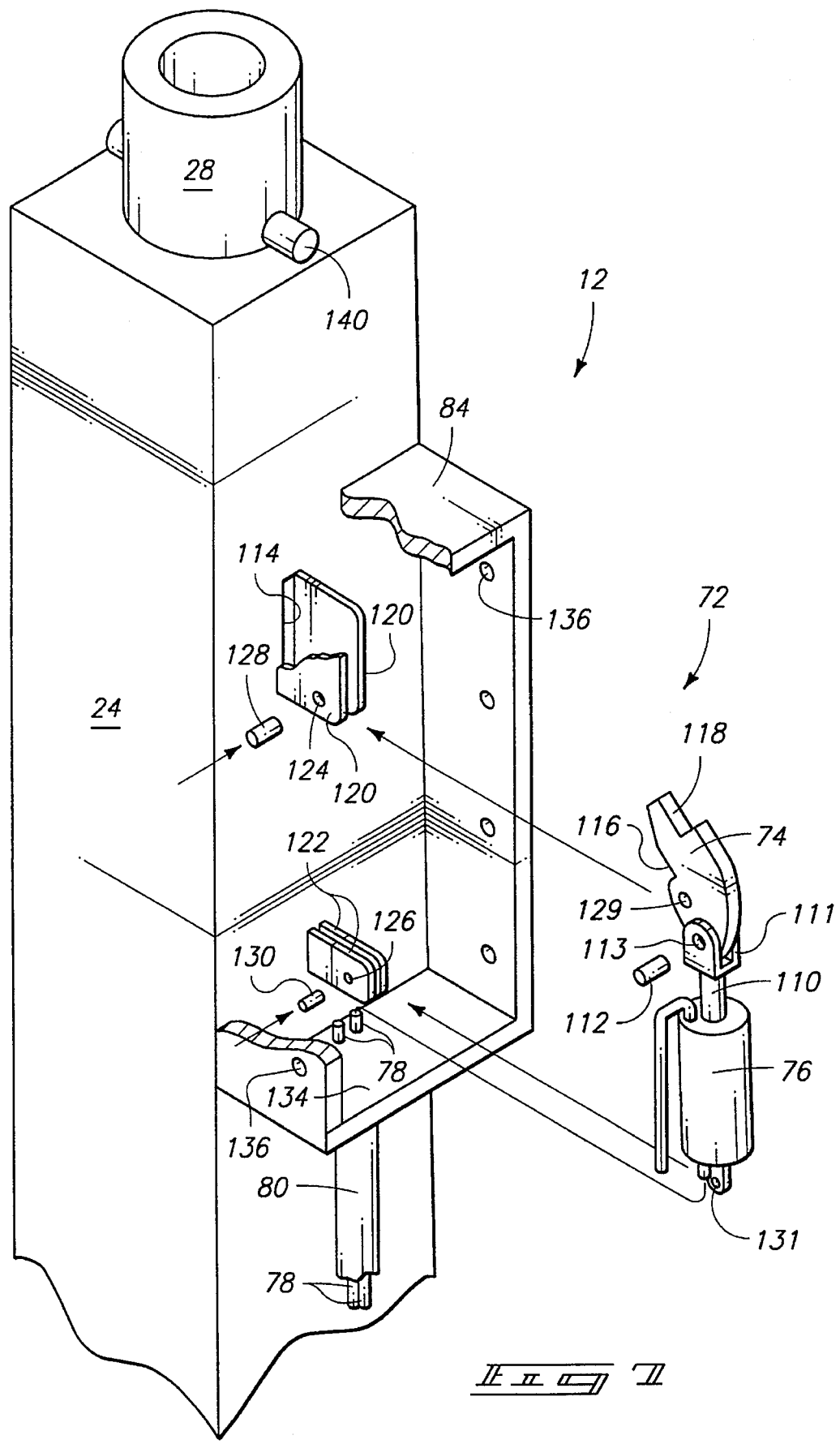

REMOTELY EXTENDIBLE BUNK STAKE FOR LOGGING VEHICLE

TECHNICAL FIELD

This invention relates to an extendible bunk stake for use on a logging vehicle, and more particularly, to a stake which can be extended remotely by an operator by manipulating an extension member of the stake.

BACKGROUND OF THE INVENTION

A typical logging truck has a series of bunks arranged across a bed of the truck for supporting logs during a hauling operation. Each bunk has a pair of laterally spaced apart and vertically extending stakes, between which logs are stacked. During a loading operation, logs are typically loaded onto the bunks by an operator using a grapple on the end of a boom loader. A skilled operator using a boom loader is capable of precisely and efficiently manipulating logs to deposit them across adjacent pairs of bunks. In this manner, loaded logs are captured along each bunk, between an associated pair of stakes. For self-loading trucks having an integral loading bed, a boom loader is often mounted directly onto the truck to enable self loading between the stakes. Alternatively, for logging trailers, the logs are typically loaded onto the trailer with another vehicle having a boom loader.

To enable complete loading of a trailer carrying logs having a relatively low density or having a relatively small diameter, extendible stakes are used to increase the volumetric carrying capacity of a trailer. For cases where large diameter loads, or high density logs are carried, the extendible stakes can be used in their lowered, or conventional-height configuration. Whereas, for situations where the load limits of the truck and trailer have not been reached, the height of the load area can be increased by extending the bunk stakes.

In some cases, bunk stakes are made adjustable in height in order to reduce clearance requirements of a truck and trailer when empty or partially loaded. If tall bunk stakes are immovably mounted atop a trailer, access to certain logging sites might be restricted due to clearance conditions under bridges and signs. Similarly, storage of such a trailer within a garage or building might be hindered. Furthermore, for tractor-trailer devices having a removable trailer portion that loads atop the tractor for a return trip home, it is necessary that bunk stakes be retractable in order to provide necessary road clearance. Such tractor-trailer combinations typically have one bunk on the tractor and another bunk on the trailer. When the trailer is loaded atop the tractor, the trailer bunk stake is raised to an even higher elevation. Therefore, there is an even greater need to have a retractable bunk stake on such a tractor-trailer combination.

One technique that enables an operator to extend the height of a bunk stake consists of manually raising and lowering a movable extension member carried within a tubular support member of a stake. However, a truck operator must climb on top of the trailer bunk in order to raise and lower the extension. While on the bunk, the operator is exposed to potential injury, particularly during loading operations. Additionally, the operator is susceptible of falling from the bunk during raising and lowering of the extension, particularly during inclement weather conditions.

Another technique for raising a bunk stake extension involves manipulation of the extension member with a log in order to raise it to a vertically extended position. This technique is used with bunk stakes having a holding arm provided on top of the extension. The arm has a barb-shaped portion configured to engage a log as it is lifted vertically from below the arm by an operator using a grapple loader. A spring-loaded latch engages with the extension member to lock the extension member within the support member. In this manner, the extension member is locked in a vertically raised position. However, it proves to be awkward and difficult to raise a stake extension in this way. Additionally, a log must be raised by an operator in order to raise the extension which adds to the danger present from an operator dropping a log. Furthermore, a truck operator must still climb up onto the trailer to manually release the latch in order to lower the extension member.

Therefore, there is a need for an extendible bunk stake that can be easily and safely raised and lowered by a truck operator. Furthermore, there is a need for an extendible bunk stake that can be raised and lowered without requiring that a truck operator climb on top of a bunk, greatly reducing any risk of injury.

BRIEF DESCRIPTION OF THE DRAWINGS

Preferred embodiments of the invention are described below with reference to the following accompanying drawings.

FIG. 1 is a perspective view of a partially loaded tractor and trailer logging vehicle having extendible bunk stakes embodying this invention;

FIG. 2 is an enlarged perspective view with portions broken away and in section of one of the bunk stakes of FIG. 1;

FIG. 3 is an enlarged centerline sectional view of the bunk stake taken along line 3—3 of FIG. 2;

FIG. 4 is a sectional view taken generally along line 4—4 of FIG. 3;

FIG. 5 is an enlarged perspective view of end portions broken away from the delivery tube of FIGS. 2 and 3;

FIG. 7 is a partially exploded and enlarged perspective view of the stake extension lock of FIGS. 2 and 3.

DETAILED DESCRIPTION OF THE PREFERRED EMBODIMENTS

Figure 6:
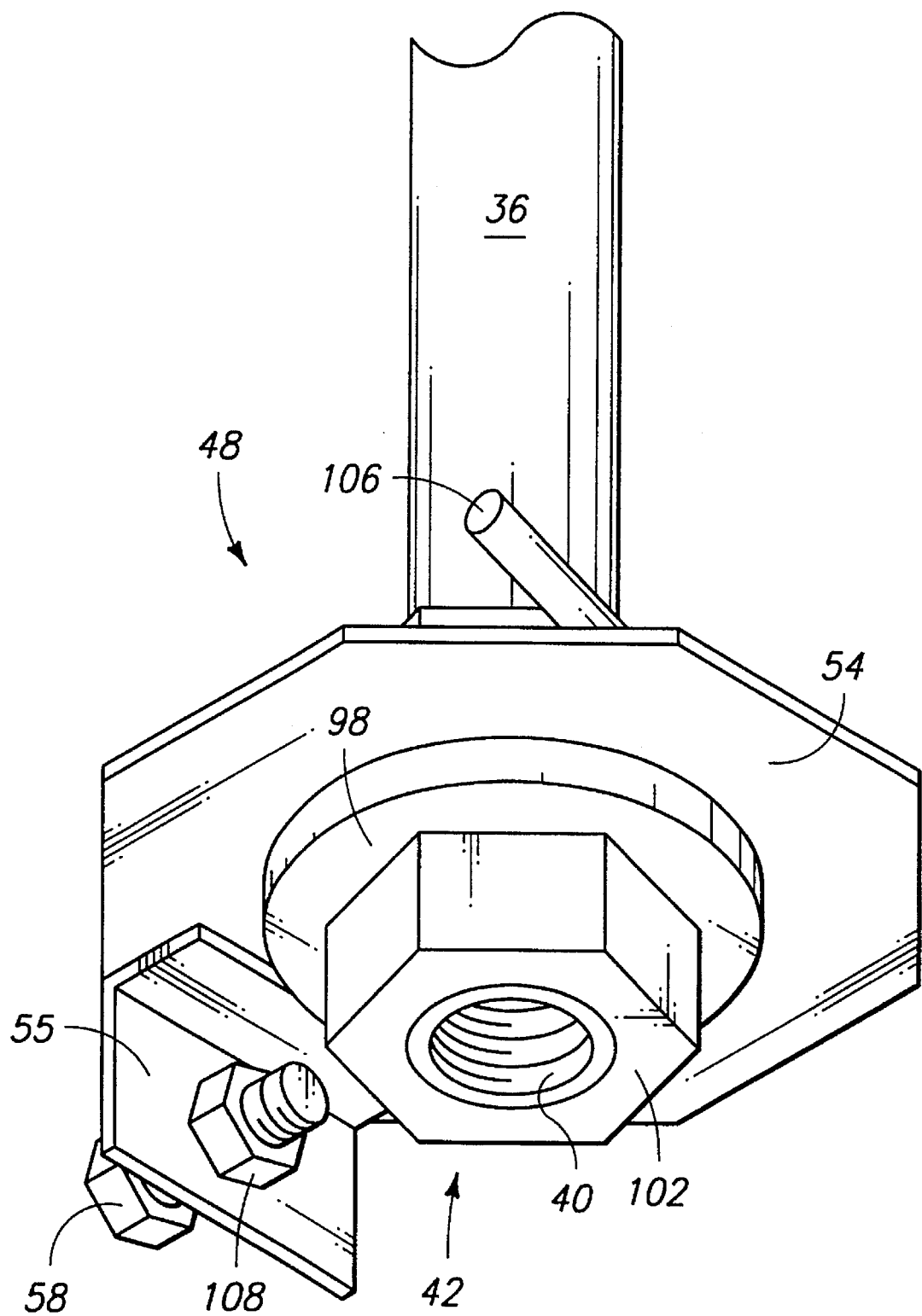
FIG. 6 is an enlarged perspective view taken generally from beneath the bottom end portion of FIG. 5.

This disclosure of the invention is submitted in furtherance of the constitutional purposes of the U.S. Patent Laws "to promote the progress of science and useful arts" (Article 1, Section 8).

Referring in more detail to the drawings, FIG. 1 illustrates a loading portion of a tractor/trailer logging vehicle 10 equipped with a plurality of bunk stakes, such as stake 12, embodying this invention. The bunk stakes are mounted in pairs on opposite sides of a loading bed 14. The bed is formed from horizontally arranged and laterally extending logging bunks 16, one bunk stake 12 mounted to each end of each bunk. The bunks are then structurally mounted together with at least one longitudinally extending main load bearing frame 17. In use, a trailer 19 is towed with a tractor 21 (partially shown) by connecting the two together with a coupling hitch 23. Alternatively, particularly for a small truck having an integral trailer bed, the bunk stakes can be mounted directly onto frame members to form a trailer bed. Irrespective of how the bunk stakes are mounted to a bed, the bunks 16 form frame members that carry associated bunk stakes 12 and cooperate to define a log loading area 18. Logs 20 are stacked in area 18 during loading with a conventional grapple boom loader 22. Alternatively, a dedicated grapple (not shown) provided on a self-loading logging vehicle can be used to load logs.

As shown in FIG. 2, bunk stake 12 has a tubular support member 24, mounted along a base portion 26 to a bunk 16. An open portion of bunk 16 directly beneath stake 12 actually forms the bottom portion of member 24. A cavity 27 formed within the member 24 slidably receives a stake extension member 28. The extension member 28 passes through an aperture 30 provided in a cap 32 on top of the support member 24. A guide tube 34 is welded within the support member 24, with the top most edge of tube 34 extending through the cap 32 to define aperture 30. A circumferential weld is then formed between the tube 34 and cap 32, joining them together. The guide tube 34 supports and guides extension member 28 within support member 24. Additionally, extension member 28 is coaxially received over a delivery tube 36 which further slidably guides extension member 28 within support member 24.

As shown in FIG. 2, a pneumatic line 38 serves as a remotely actuatable motor, delivering a supply of pressurized working fluid to the bottom of tube 36, for raising extension member 28. The fluid acts on a piston 35 which is formed inside member 28 by a metal bulkhead. Line 38 couples in fluid communication with a main supply line 39 carried by and extending longitudinally of frame 17, as shown in FIG. 1. Line 38 is preferably coupled to main line 39 by way of a solenoid (not shown). One solenoid suitable for use can be found in a 2-speed shifter overdrive gear assembly currently in use on rear axle drives of tractors. Such a solenoid is used to trigger a gear shifter in the rear end of the axle assembly. In this manner, a solenoid is electrically activated by an operator remotely therefrom via electrical lead lines 43 (see FIG. 1) in order to pneumatically charge line 38 and raise extension member 28.

As shown in FIG. 1, line 39 forms an air supply line on vehicle 10 in the form of a service air can configured to supply working fluid for operating components on the tractor 21 and trailer 19. Alternatively, hydraulic fluid can be used as the working fluid in conjunction with a hydraulic pump applied at a source. According to FIG. 2, line 38 is mated in sealing engagement with a threaded inlet fitting 40 at a bottom end 42 of the delivery tube 36. A delivery port 44 is provided at a top end 46 of the delivery tube 36 for passage of working gasses therethrough. An expansible chamber 48 is formed between top end 46 of tube 36 and an inner surface of the extension member 28, situated above the top end as the extension member 28 moves thereabove. A circumferential piston seal 50 is also provided about top end 46 for slidably sealing in engagement within extension member 28 as it extends and retracts there along.

To enhance responsiveness, expansible chamber 48 is sized with a small volume when the extension member is lowered to its retracted position, relative to the volume formed when it is raised to its fully extended position. By way of example, when using a pneumatic working fluid, a favorable volumetric fluid capacity for chamber 48 when member 28 is extended versus retracted is at least 1.5 to 1.0, and preferably at least 3.0 to 1.0. In this manner, the amount of working gas which needs to be delivered via line 38 and tube 36 to raise member 28 is minimized. When using a hydraulic working fluid, the ratio of volumetric fluid capacities is not as important due to the essentially incompressible nature of hydraulic fluids.

According to FIG. 2, pneumatic line 38 is formed from a high pressure plastic pneumatic hose. Line 38 is routed outside of and along bunk 16, within a 1" diameter protective steel pipe 37. Pipe 37 is welded to the outside of bunk 16 to substantially protect the line from any damage caused by impacts with logging equipment and logs during a loading operation.

As further shown in FIG. 2, delivery tube 36 is rigidly secured within support member 24 along each end. Top end 46 of delivery tube 36 is rigidly secured by snugly fitting it within extension tube 28 and guide tube 34, through coaction of slidable seal 50. Bottom end 42 of tube 36 carries a support pedestal 54 for supporting the bottom end 42 within member 24; namely, within a portion of member 24 formed by an open end of bunk 16.

Pedestal 54 is formed from a piece of octagonal-shaped steel plate sized to fit within an open portion of bunk 16 beneath member 24. A downwardly depending flange 55 is formed on one edge of pedestal 54 to facilitate mounting to bunk stake 12. A keystock 56 extends between opposed vertical faces of member 24 in order to support an opposed edge of the pedestal. In this case, keystock 56 is welded to the member that forms bunk 16. A bolt 58 is received through a clearance hole 60 (see FIG. 1) in member 24 of bunk stake 12 in order to retain pedestal 54 and flange 55 there along.

In use, bunk stake 12 must be able to retain a full loaded of logs on top of a logging vehicle. Therefore, the bending strength of extension member 28 and support member 24 should be optimized, particularly for bending loads acting between the two members. Hence, guide tube 34 is securely welded within top end 46 of support member 24. As shown in FIGS. 3 and 4, member 24 is formed from a piece of tapered square tube that is welded to an open outer end of each bunk 16. Guide tube 34 is fitted and welded into tube 24 with four radially equispaced steel shims 52, as shown in FIG. 4. Additionally, cap 32 is welded to the top of support member 24, as well as circumferentially around the end of guide tube 34, as shown in FIG. 3.

According to FIG. 3, to ensure stake 12 is sufficiently strong, guide tube 34 is formed from a length of 6" long, 3½" outer diameter, ½" wall thickness 4140 stock steel, or cylindrical pipe. To allow for smooth motion of stake extension 28 therethrough, 0.030" of material is then removed from the inner diameter. Shims 52 are formed from 6" lengths of ¼" thick steel plate. Furthermore, tapered square-rectangular upper tube of member 24 is formed from a 66" long piece of 4" by 4" (at the top) outer dimension and 4" by 5" (at the bottom), ⅜" T1 plate that is welded into tubing. Similarly, end cap 32 is formed from ⅜" thick T1 steel plate. Delivery tube 36 is formed from a 61" length of 1" outer diameter Shelby tubing of ⅝" inner diameter. To provide adequate bending strength, extension member 28 is formed from a 54" length of 2.5" outer diameter Shelby tubing of 0.5" thickness.

As shown in FIGS. 2 and 3, the tapered tube of support member 24 is welded about it's bottom outer circumference to a top face of bunk 16 directly over a top opening 62. A bottom opening 64 is also provided directly beneath top opening 62 to facilitate assembly and removal of extension 28, delivery tube 36, and delivery line 38. Likewise, bottom opening 64 facilitates maintenance of bunk stake 12. Furthermore, each bunk stake is securely supported on each bunk 16 by welding three gusset plates 66 between member 24 and bunk 16, as shown in FIG. 3. A suitable bunk stake gusset plate 66 is formed from ⅜" thick plate steel welded into place and configured to enhance bending stiffness between bunk stake 12 and bunk 16. Each gusset plate has a serpentine or v-shaped free edge which facilitates close adjoining placement of logs in the crotch region formed between stake 12 and bunk 16, while still enforcing joint stiffness therebetween.

As shown in FIGS. 2 and 3, a ring-shaped retaining member 68 is welded to the bottom of extension member 28 in order to prevent inadvertent loss of the extension member completely through guide tube 34 when raising it to the fully extended configuration. Additionally, member 68 is used to lock extension member 28 in the raised configuration, as discussed below. Retaining member 68 is constructed from a ½ inch thick piece of 4140 steel tube that is circumferentially welded to member 28. A similarly configured resilient rubber washer, or snubber 70 is retained atop member 68 in order to snub extension member 28 when it is fully extended. Snubber 70 prevents hard contact of member 68 with the bottom edge of guide tube 34, thereby preventing any possible damage from occurring therebetween.

FIG. 3 depicts a locking assembly 72 carried by support member 24 at an elevated location and actuated to engage with retaining member 68 when extension member 28 is pneumatically raised to an elevated position. Locking assembly 72 includes a lock member 74 pivotally positioned by way of a dual action pneumatic air cylinder 76 to engage with a bottom surface of retaining member 68. In operation, line 38 delivers working fluid when an operator actuates a corresponding solenoid, raising extension member 28. Then a three-way solenoid (not shown) delivers working fluid via one of two delivery lines 78 connected via the solenoid with the main supply line 39 (of FIG. 1) and to one end of cylinder 76. The solenoid has three positions: one open position for extending cylinder 76 via a first line 78, a second open position for retracting cylinder 76 via a second line 78, and a third closed position. Member 74 is then pivoted into a locked position after which the first solenoid is turned off, dropping the member 28 under its own weight onto the member 74 at least partially due to nominal leakage of fluid past seal 50. Alternatively, the working fluid can be removed from working chamber 48 by drawing a reduced pressure at its source, causing extension member 28 to be lowered. As a result, extension member 28 is supported in a raised configuration.

To lower extension member 28 of FIG. 3 from a raised position, locking member 74 is rotated out of the locked position. However, working fluid is first delivered via line 38 and tube 36 to chamber 48, slightly raising extension member 28 as a result thereof. Subsequently, cylinder 76 retracts member 74 when the solenoid opens a second of delivery lines 78, driving an opposite end of the cylinder to a retracted position. Extension member 28 then lowers under its own weight as the source of working fluid is cut off, and fluid leaks from chamber 48. Alternatively, a vacuum can be drawn at the source.

A suitable delivery line 78 depicted in FIG. 3 is formed from a high pressure plastic pneumatic hose, similar to that used for line 38. However, a pair of lines 78 are carried along the outside of support member 24 from the locking assembly 72 and along bunk stake 16. With this construction, the tubes are subjected to possible damage during use. Therefore, lines 78 are housed within a ¾ inch diameter steel pipe that extends along the outside of member 24, and joins pipe 37. Pipe 37 then houses lines 78 and line 38 along bunk 16, protecting them all the way to the vehicle frame. Pipe 80 is secured to member 28 and bunk 16 by welding it to assembly 72, support member 24, and the end of bunk 16. Similarly, pipe 37 is welded to the end of pipe 80 and bunk 16.

In order to protect the cylinder 76 and lock member 74 during use, a housing 84 is welded directly onto support member 24, as shown in FIGS. 3 and 4. Preferably, housing 84 and pipe 80 are welded onto a forward face of a bunk stake 12 at the front of a vehicle, and along a back face of a bunk stake 12 at the rear of a vehicle. In this manner, any tendency for the housing and pipe to be damaged during loading operations is minimized, wherein chains, lift straps, as well as grapples are commonly positioned between the front and rear bunk stakes of a vehicle during the hauling and loading/unloading of logs.

As shown in FIGS. 3 and 4, housing 84 is formed by welding together four separate pieces of sheet steel directly to support member 24. A cover 86 is then removably received onto housing 84 with threaded fasteners 88, which completely encases the locking assembly 72 therein. Construction details of the locking assembly 72 and housing 84 will be discussed in further detail below with reference to FIG. 7.

FIGS. 5 and 6 illustrate construction details for the top end 46 and bottom end 48 of delivery tube 36. As shown in FIG. 5, circumferential piston seal 50 is formed along the top end 46. Seal 50 is constructed from a pair of hydraulic seal members 90 that are sandwiched together between a pair of steel washers 92, one on each end. Washers 92 and seal members 90 are securely mounted onto top end 46 of delivery tube 36 between a pair of circumferential grooves 90 that receive complementary corresponding snap rings 96 therein. In this manner, maintenance and replacement of seal members 90 is easily accomplished, even in the field by a truck operator during use. As was previously discussed, bottom opening 64 provided beneath bunk stake 12 facilitates access to and removal of delivery tube 36.

To assemble piston seal 50, a first snap ring 96 is mounted into a lower of the two grooves 94, after which a first steel washer 92 is lowered on top of the first snap ring by passing it over the top of tube 36. Subsequently, a pair of seal members 90 are likewise passed over the tube 36 to rest atop washer 92. Then, a second washer 92 and a second snap ring 96 are placed atop the seal members. The top ring 96 is then snapped into corresponding top groove 90, entrapping the washers and members between the pair of snap rings.

FIGS. 5 and 6 illustrate construction of bottom end 48 on delivery tube 36. Namely, delivery tube 36 is securely mounted to the support pedestal 54 by trapping the pedestal between a pair of somewhat-compliant washers 98 and a threaded top and bottom retaining nut 100 and 102, respectively. A bottom-most outer surface of delivery tube 36 receives threads (not shown) to which nuts 100 and 102 are threadingly engaged. Washers 98 are constructed from a ½ inch thick piece of Nylatron™ having an outer diameter of 2⅜ inches and an inner diameter of 1 inch. Nylatron™ is a registered trademark of The Polymer Corporation of Reading, Pa. Nylatron™ has somewhat resilient properties enabling assembly of delivery tube 36 within support member 24, even where part tolerances during construction and assembly of stake 12 have not been precisely maintained (i.e. alignment of tube 36 within member 24). Additionally, nut 100 has a set screw 104 for locking the nut onto delivery tube 36. Furthermore, a turn lock rod 106 is welded onto one face of nut 100 to prevent rotation of the nut and delivery tube once they are placed within support member 24. An end of rod 106 abuts in assembly with a corresponding inner face of the rectangular-shaped member 24, most likely with a face of bunk 16, thereby preventing rotation therein as nut 102 is being turned.

As shown clearly in FIG. 6, depending flange 55 is preferably formed from a piece of 1 inch angle-iron that is welded to a bottom face of support pedestal 54. A backing nut 108 is then welded to an inner face of flange 55 about a receiving hole for receiving bolt 58 during assembly of the delivery tube 36 within the bunk stake 12. Furthermore, the bottom end 42 of delivery tube 36 forms a threaded inlet fitting to which delivery line 38 is threadingly and sealingly engaged.

As shown in FIGS. 5 and 6, support pedestal 54 is assembled to delivery tube 36 by first threading nut 100 to a desired axial position on delivery tube 36. Once a desired actual position has been determined, set screw 104 is tightened in order to lock the position of nut 100 onto tube 36. Subsequently, a first of washers 98 is received onto tube 36, after which support pedestal (having a central receiving hole therein) is received over a bottom end 42 of tube 36 until it engages with washer 98. Subsequently, a second washer 98 is received over end 42 and brought into engagement with a bottom face of pedestal 54. Finally, nut 102 is received over end 42 to which it is threadingly engaged. In this manner, nuts 100 and 102 can be threaded in opposed engagement, sandwiching washers 98 and pedestal 54 therebetween. Preferably, nut 100 is rotated to a position such that lock rod 106 is substantially parallel to flange 55 of pedestal 54 so it will align with an inner side wall of support member 24.

FIG. 7 illustrates construction of locking assembly 72 along an upper region of support member 24 of bunk stake 12. Lock member 74 is pivotally retained to an actuator rod 110 by pivot pin 112. The actuator rod 110 is extended as working gases are delivered through a first tube 78 into dual-acting cylinder 76. Preferably, cylinder 76 is a two way cylinder, with a tube 78 received at either end, for extending and retracting the cylinder, in response to pressurized air delivered thereto. Extension of cylinder 76 extends rod 110 and pivots lock member 74 inside of support member 24 to a locked position. A slot 114 is cut into support member 24 through which member 74 is pivotally received. A bottom edge of slot 114 engages with a seat 116 on member 74 when it is pivoted into a horizontal, or locked position. In this locked position, a shelf 118 extends inside of member 24 on which a bottom edge of extension member 28 seats, supporting the extension in an elevated position there along.

Lock member 74 and cylinder 76, once assembled together, are further supported on support member 24 by top and bottom pairs of mounting brackets 120 and 122, respectively. Each bracket is edge-welded to an outer face of member 24. Brackets 120 are welded on either side of slot 114, being spaced apart sufficiently to allow for mounting of yoke 111 on actuator rod 110 and lock member 74 therethrough. Similarly, members 122 are also edge welded to an outer face of member 24. Members 120 each have a receiving bore 124 for receiving a retaining pin 128 that is configured to retain lock member 74 via a mounting bore 129. Similarly, brackets 122 each have a mounting hole 126 for receiving a pivot pin 130, retaining cylinder 76 via a similar mounting bore 131. Preferably, pins 112, 128 and 130 are cold formed on each end to form a head subsequent to assembly in order to insure retention within each respective bore. Alternatively, each pin can be secured with a complementary threaded fastener to insure retention there along.

In order to facilitate retention of cover 86 (of FIG. 4) to housing 84 (of FIG. 7), a pair of steel angles 132 are welded to the back of cover 86, as shown in FIG. 4. In assembly, each angle is received inside the mouth portion of housing 84. Each angle has four equal-spaced bores 134 that align with bores 136 in housing 84 (of FIG. 3). A backing nut 138 is welded to each angle behind each bore 134 in order to receive each fastener 88 when assembling cover 86 there along.

In order to prevent inadvertent loss of extension member 28 through guide tube 34, a retaining bolt 140, or rod is securely mounted through a top portion of the extension member 28. When member 28 is lowered, bolt 140 seats with the top of the support member 24, preventing further passage therethrough.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

I claim:

1. An extendible bunk stake mounted on a logging vehicle, comprising:

a tubular support member having an internal cavity, an outlet port communicating with the cavity, a fluid delivery port for transferring working fluid, and a fluid seal, the support member constructed and arranged to mount the stake to a bed of the vehicle;

an extension member having at least a portion slidably received within the internal cavity of the tubular support member and movable between extended and retracted positions relative to the tubular support member, a piston being formed from the extension member such that the extension member, the fluid seal, and the piston cooperate to define an expansible working chamber, the extension member being slidably received in sealing engagement with the fluid seal of the support member; and a source of working fluid configured in fluid communication with the expansible working chamber via the fluid delivery port, the source being constructed and arranged to selectively transfer a working fluid between the working chamber and the source, the extension member being movable in response to such fluid transfer.

2. The bunk stake of claim 1 wherein working fluid is transferred from the source to the working chamber by an operator at a location remotely of the bunk stake.

3. The bunk stake of claim 1 wherein the support member further comprises a guide tube configured to slidably receive the extension member, the guide tube providing the outlet port of the support member at a top end, and the guide tube communicating with the internal cavity at a bottom end.

4. The bunk stake of claim 1 further comprising a delivery tube carried by the support member substantially within the internal cavity, a bottom end of the delivery tube configured in fluid communication with the source of working fluid, the fluid delivery port provided at a top end for delivering working fluid to the expansible working chamber, and the fluid seal provided adjacent the top end, the fluid seal and the top end being constructed and arranged for slidable and substantially sealing engagement within the extension member, the extension member being supported for movement relative to the fluid seal, the delivery tube, and the support member.

5. The bunk stake of claim 1 further comprising a guide tube having an inner diameter sized to slidably receive the extension member in substantially collinear relation, the guide tube carried by the support member to provide the outlet port of the support member at a top end.

6. The bunk stake of claim 1 wherein the bed of the vehicle comprises a substantially horizontal and laterally extending bunk to which the bunk stake is affixed in a substantially elevated configuration.

7. The bunk stake of claim 5 wherein the bunk stake is affixed to an end of the bunk.

8. The bunk stake of claim 1 wherein volumetric fluid capacity of the expansible chamber when the extension member is positioned in the fully extended state is at least three times the volumetric fluid capacity when the extension member is positioned in the fully retracted state.

9. The bunk stake of claim 1 wherein the extension member further comprises a retaining member and the support member further comprises a guide tube supported at a top end of the support member for slidably receiving the extension member, the retaining member configured to engage in abutment with a lower end of the guide tube to limit motion of the extension member when raised to a topmost position.

10. The bunk stake of claim 9 further comprising a resilient snubber carried by the retaining member and configured for resilient engagement between a bottom end of the guide tube and the retaining member.

11. The bunk stake of claim 1 further comprising a lock member for releasably retaining the extension member in the extended position.

12. The bunk stake of claim 11 wherein the lock member further comprises a latch assembly having a fluid actuated cylinder for moving the lock member between latched and unlatched positions, the latched position configured to retain the extension member in an elevated configuration.

13. The bunk stake of claim 1 wherein the source of working fluid comprises a pneumatic delivery line fluid coupled with the expansible working chamber for delivering compressed gas between the pneumatic delivery line and the expansible working chamber.

14. The bunk stake of claim 1 wherein the source of working fluid comprises a hydraulic delivery line containing hydraulic fluid for delivery between the hydraulic delivery line and the expansible working chamber.

15. An extendible bunk stake mounted on a logging vehicle, comprising:

a support member having an internal cavity and an outlet port communicating with the cavity, the support member constructed and arranged to mount the stake to a bunk of the vehicle;

an extension member at least partially slidably received within the internal cavity and movable between extended and retracted positions, the extension member being slidably received through the outlet port; and a remotely actuatable motor configured in direct communication with the extension member and the support member, the motor being constructed and arranged to slidably extend and retract the extension member relative to the support member in response to application of force by the motor.

16. The bunk stake of claim 15 wherein the remotely actuatable motor comprises a source of working fluid configured in fluid communication with an expansible working chamber, a piston of the extension member and a portion of the cavity cooperating to define the expansible working chamber, the source of working fluid being constructed and arranged to selectively transfer a working fluid between the expansible working chamber and the source of working fluid, the extension member being movable in response to selective transfer of working fluid.

17. The bunk stake of claim 16 wherein working fluid is transferred from the source to the expansible working chamber by an operator at a location remote from the bunk stake.

18. An extendible bunk stake mounted on a logging vehicle, comprising:

a tubular support member having an internal cavity, an outlet port communicating with the cavity, a fluid delivery tube carried in the cavity having a fluid delivery port in fluid communication with the working fluid and a fluid seal, the support member constructed and arranged to mount the stake to a bed of the vehicle;

a hollow extension member having at least a portion slidably received within the internal cavity of the tubular support member and movable between extended and retracted positions relative to the tubular support member, a piston being formed within the hollow extension member such that the fluid seal is slidably received within the hollow extension member and the extension member, the fluid seal and the piston cooperating to define an expansible working chamber within the hollow extension member, the extension member being slidably received in sealing engagement with the fluid seal of the support member; and a source of working fluid configured in fluid communication with the expansible working chamber via the fluid delivery port, the source being constructed and arranged to selectively transfer a working fluid between the working chamber and the source, the extension member being movable in response to fluid transfer;

the fluid seal being protected in use from damage via provision of the fluid seal within the hollow extension member.

19. The bunk stake of claim 18 wherein the source of working fluid comprises a hydraulic delivery line containing hydraulic fluid for delivery between the hydraulic delivery line and the expansible working chamber.

* * * * *